US006985318B2

(12) United States Patent
Clinton et al.

(10) Patent No.: US 6,985,318 B2
(45) Date of Patent: Jan. 10, 2006

(54) METHOD AND APPARATUS FOR PRECESSIONAL SWITCHING OF THE MAGNETIZATION OF STORAGE MEDIUM USING A TRANSVERSE WRITE FIELD

(75) Inventors: Thomas W. Clinton, Pittsburgh, PA (US); Thomas M. Crawford, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 114 days.

(21) Appl. No.: 10/454,094

(22) Filed: Jun. 3, 2003

(65) Prior Publication Data

US 2003/0227701 A1 Dec. 11, 2003

Related U.S. Application Data

(60) Provisional application No. 60/386,774, filed on Jun. 6, 2002.

(51) Int. Cl.
*G11B 5/09* (2006.01)

(52) U.S. Cl. .......................................... 360/46; 360/55

(58) Field of Classification Search .................. 360/46, 360/55, 123–126; 365/158, 170–173
See application file for complete search history.

(56) References Cited

U.S. PATENT DOCUMENTS 6,483,741 B1 * 11/2002 Iwasaki et al. ............. 365/170
6,700,720 B1 * 3/2004 Allenspach et al. .......... 360/46
6,768,603 B2 * 7/2004 Cideciyan et al. ............ 360/45
6,816,339 B1 * 11/2004 Litvinov et al. ............ 360/125

* cited by examiner

*Primary Examiner*—David Hudspeth
*Assistant Examiner*—Dan I Davidson
(74) *Attorney, Agent, or Firm*—Buchanan Ingersoll PC

(57) ABSTRACT

A magnetic recording process generally including the steps of determining an initial magnetization direction of a magnetic recording medium, and selectively applying a magnetic field to the magnetic recording medium along an axis substantially perpendicular to an axis of the initial magnetization direction of the recording medium. The magnetic field is selectively applied for a period of time sufficient to switch the magnetization of the magnetic recording medium from its initial magnetization direction to a final magnetization direction substantially anti-parallel to the initial magnetization direction. Typically, the initial and final magnetization directions will be along an easy axis of magnetization of the magnetic recording medium.

23 Claims, 6 Drawing Sheets

METHOD AND APPARATUS FOR PRECESSIONAL SWITCHING OF THE MAGNETIZATION OF STORAGE MEDIUM USING A TRANSVERSE WRITE FIELD

CROSS-REFERENCE TO RELATED APPLICATIONS

This application claims the benefit of provisional patent application Ser. No. 60/386,774 entitled "Precessional Switching of the Magnetization of a Storage Medium with a Transverse Write Field", filed on Jun. 6, 2002, the entire disclosure of which is incorporated by reference herein.

FIELD OF THE INVENTION

The present invention is directed toward magnetic recording processes and, more particularly, toward a magnetic recording process utilizing a write field applied transverse to the magnetization of the recording medium.

BACKGROUND OF THE INVENTION

The ability to increase the storage capacity of magnetic recording media is an on going concern. As the bit areal densities of magnetic recording media continue to progress in an effort to increase the storage capacity of hard disc drives, the physical size of the sensors and writers designed to read and write data from and to the magnetic recording media must correspondingly decrease. As a result of this push to increase the storage capacity of hard disc drives, magnetic transition, i.e., bit, dimensions and, concomitantly, recording head critical features are being pushed below the 100 nm scale. In a parallel effort, in order to make the magnetic recording medium stable at higher areal densities, magnetically harder recording medium materials having a high coercivity are required. The high coercivity of the recording medium helps to ensure the thermal stability of the data recorded thereon. However, a problem with using high coercivity recording media is that the magnetic field from the small recording pole needs to be sufficient to overcome the coercivity of the magnetic recording medium in the disc in order to define the recorded bits along the recording track in the recording medium.

Traditionally, writing to a harder recording medium has been achieved by increasing the saturation magnetic flux density, i.e., $4\pi M_s$ value, of the magnetic material which makes up the inductive write head, thus bolstering the magnetic field applied to the recording medium. Although there has been some success in the field of materials research to increase the saturation magnetization $M_s$ of write heads, the rate of increase that has been achieved is not significant enough to sustain the annual growth rate of bit areal densities in disc drive storage applications. Further, continued increases in the saturation magnetization of write heads is likely unsustainable as the materials typically used for write heads reach their fundamental limitations.

A consequence of higher areal densities in magnetic recording has been an increase in the data rates at which the data is magnetically recorded. Data rates are advancing toward a point where they will reach a giga-hertz (GHz) and beyond. At these high data rates, it becomes increasingly difficult to switch the magnetization of the recording medium using a conventional write field applied anti-parallel to the magnetization direction of the recording medium, i.e., to the recording medium's easy axis of magnetization.

Thus, there is a need in the field of magnetic recording for a recording process capable of switching higher coercivity recording media at increasingly higher data rates.

The present invention is directed toward overcoming one or more of the above-mentioned problems.

SUMMARY OF THE INVENTION

A magnetic recording process is provided according to the present invention whereby the write field is applied perpendicular to the recording medium magnetization direction (easy axis of magnetization) in order to write a bit (magnetic transition) in the recording medium. Specifically, a transverse write field, with a magnitude exceeding a predetermined minimum value, is applied to the recording medium for a duration of time less than a magnetic time scale of the medium, typically on a nanosecond timescale, such that the magnetization of the recording medium switches precessionally to its opposite state. The transverse write field applies the maximum torque to the recording medium magnetization, thus minimizing the energy required to write a magnetic transition (bit). The short time scale of the applied magnetic field makes it possible to extend data rates well beyond present recording technology. The inventive magnetic recording process may be utilized on both longitudinal and perpendicular oriented recording media.

The inventive magnetic recording process generally includes the steps of determining an initial magnetization direction of the magnetic recording medium, and selectively applying a magnetic field to the magnetic recording medium along an axis substantially perpendicular to an axis of the initial magnetization direction of the recording medium. The magnetic field is selectively applied for a period of time sufficient to switch the magnetization of the magnetic recording medium from its initial magnetization direction to a final magnetization direction substantially anti-parallel to the initial magnetization direction. Typically, the initial and final magnetization directions will be along an easy axis of magnetization of the magnetic recording medium.

In one form, the initial magnetization direction of the magnetic recording medium is compared with the magnetization direction of a bit to be recorded and, if the compared magnetization directions are different, the magnetic field is applied to the magnetic recording medium to precessionally switch the magnetization of the magnetic recording medium from its initial magnetization direction to the final, anti-parallel magnetization direction of the bit to be recorded. If, on the other hand, the compared magnetization directions are the same, no magnetic field will be applied to the magnetic recording medium, such that the magnetic recording medium is left in its initial magnetization direction which is the magnetization direction of the bit to be recorded. Thus, when the compared magnetization directions are the same, no magnetic field is required by the inventive recording process to record a bit.

In another form, the magnetic recording media is DC erased prior to magnetically recording information thereon. DC erasing the recording medium ensures that the medium is uniformly magnetized along the data path to be written, thus allowing the initial magnetization direction of the magnetic recording medium to be determined. A selectively applied magnetic field reverses the magnetization of the recording medium where appropriate, and where the DC erased magnetization direction is desired, no magnetic field is applied so that no magnetization switching occurs.

A magnetic recording device for magnetically recording information on a magnetic recording medium is also provided according to the present invention. The magnetic recording device includes a main magnetic pole positionable adjacent the magnetic recording medium, and a coil magnetically coupled to the main magnetic pole for developing a magnetic field in the main magnetic pole in a first magnetization direction. In accordance with the present invention, the magnetic recording medium has an easy axis of magnetization along which magnetic transitions, or bits, are recorded. The first magnetization direction of the magnetic field is substantially perpendicular to the magnetic recording medium's easy axis of magnetization. The magnetic field developed in the main magnetic pole is selectively applied to the magnetic recording medium in the first magnetization direction for a select period of time sufficient to switch the magnetization of the magnetic recording medium from an initial magnetization direction to a final magnetization direction substantially anti-parallel to the initial magnetization direction. The magnetic recording device may further include a controller operatively connected to the coil for selectively energizing the coil to selectively develop the magnetic field in the main magnetic pole.

In one form, the controller includes a magnetic read head for determining the initial magnetization direction of the magnetic recording medium, and a comparison circuit receiving the determined initial magnetization direction and the magnetization direction of a bit to be recorded. Based on a comparison of the magnetization directions, the comparison circuits generates an output signal to selectively energize the coil to selectively develop the magnetic field in the main magnetic pole to switch the initial magnetization direction of the magnetic recording medium where appropriate. The output signal, by selectively energizing the coil, generates an appropriate sequence of magnetic field pulses in the main magnetic pole to reverse the initial magnetization direction of the magnetic recording medium where appropriate and, where the initial magnetization direction is desired, the main magnetic pole is left in its quiescent state so that no magnetic switching of the magnetic recording medium occurs.

It is an aspect of the present invention to increase the data rate of magnetic recording processes.

It is a further aspect of the present invention to increase the storage capacity of hard disc drives.

It is yet a further aspect of the present invention to utilize materials having high coercivities as magnetic recording media in magnetic recording processes.

It is still a further aspect of the present invention to develop a magnetic recording process capable of switching higher coercivity recording media at increasingly higher data rates.

Other aspects and advantages of the present invention can be obtained from a study of the specification, the drawings, and the appended claims.

DETAILED DESCRIPTION OF THE INVENTION

Figure 1:
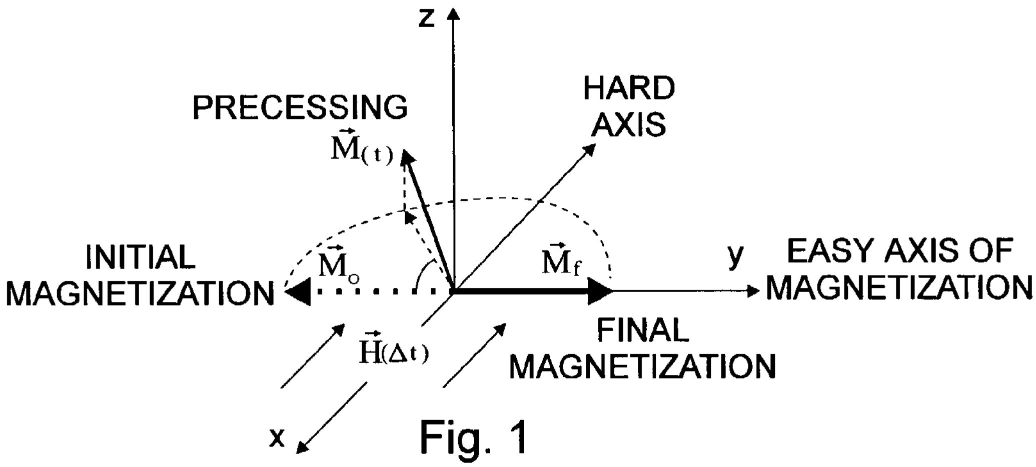
FIG. 1 is a schematic illustration of the precessional switching process according to the present invention.

The present invention demonstrates that magnetization reversal can be achieved in lithographically defined magnetic elements using sub-nanosecond magnetic field pulses applied along the magnetization hard axis at right angles to the initial magnetization direction of the magnetic elements. In fact, the present invention reveals that the magnetization can be reversed from either of its bi-stable states with a unidirectional, transverse magnetic field pulse. The field pulse need only be applied with enough field strength that the precessional trajectory of the magnetization overshoots the magnetic hard axis (goes beyond 90° from the easy axis of magnetization), while the pulse duration should be short enough that the field turns off just before the magnetization reaches the anti-parallel direction, i.e., $\Delta t<\tau_{\pi}$, where $\tau_{\pi}$ is the time required to precessionally switch the magnetization 180°. The underlying physics of the present invention are expressed by the following Landau-Lifshitz equation, which provides a simple model to describe the dynamics of a single-domain magnetization $\vec{M}$ in the presence of a magnetic field $\vec{H}$.

$$\frac{d\vec{M}}{dt} = -\mu_o\gamma\vec{M}\times\vec{H} - \alpha\left(\frac{\mu_o\gamma}{|\vec{M}|}\right)\vec{M}\times(\vec{M}\times\vec{H}). \quad \text{(Eq. 1)}$$

The constants in Eq. 1 are as follows: $\mu_o$—the permeability of free space; $\gamma$—the gyromagnetic ratio of the media; $\alpha$—the damping constant of the media. The first term of Eq. 1 describes the precessional motion of the magnetization $\vec{M}$ about the field $\vec{H}$, while the second term of Eq. 1 represents the damping of the precessional motion and ultimately will force the magnetization $\vec{M}$ to relax along the magnetic field $\vec{H}$. For timescales short enough, the precessional motion term of Eq. 1 describes most of the dynamics, as there is no time for significant damping to occur. In magnetic recording processes, the conventional write process is quasi-static and damping term of Eq. 1 will describe the relevant dynamics of the magnetization of the storage medium, where $\vec{M}$ ultimately relaxes along the effective direction of the write field, i.e., $\vec{M}\|\vec{H}_{write}$, parallel to the easy axis of magnetization of the storage medium. However, it has been found herein that a writing process using a transverse magnetic field has the benefit of applying the field with a maximum torque, T, applied to the magnetization where $T=|\vec{M}||\vec{H}|\sin\theta=(|\vec{M}\times\vec{H}|)$, and $\theta$ is the angle between $\vec{M}$ and $\vec{H}$. Additionally, it has been found herein that if the magnetic field is applied on a short timescale, such that the magnetization reverses precessionally, then the switching speed will exceed current state-of-the-art data rates. Both of these aspects associated with the precessional switching method described herein minimize the energy needed to reverse the magnetization, and are conducive to extending areal densities and data rates in the field of magnetic recording.

The precessional switching process of the present invention is schematically depicted in FIG. 1. The magnetization of the recording medium is in an initial state $\vec{M}_o$ along the recording medium's easy axis of magnetization, which is shown along the y-axis in FIG. 1. A magnetic field pulse $\vec{H}(\Delta t)$ is applied perpendicular to the initial magnetization $\vec{M}_o$ with a sufficient magnitude that the initial magnetization $\vec{M}_o$ overshoots its hard axis (goes beyond 90° from the easy axis of magnetization). If the damping constant, $\alpha$, of the recording media is small enough, the precessional overshoot helps to reduce the transverse magnetic field required for switching. If the magnetic field is turned off just before the magnetization precessional trajectory $\vec{M}(t)$ passes the anti-parallel direction, the final magnetization $\vec{M}_f$ will be reversed from the initial magnetization $\vec{M}_o$. While the field pulse $\vec{H}(\Delta t)$ is shown in FIG. 1 as applied along the x-axis, which is a magnetic hard axis of the recording media, the magnetic filed pulse $\vec{H}(\Delta t)$ may also be applied along the z-axis, which is another magnetic hard axis of the media, without departing from the spirit and scope of the present invention. The inventive switching process, as outlined above, requires knowing the initial magnetization state to achieve a particular, final magnetization state.

The above-outlined inventive method is particularly useful in disc storage recording processes, where the magnetization is that of the magnetic recording medium and the write head delivers the transverse magnetic field pulse. The write field is a spatial and temporal coordination of both a transverse (switching) field and a field parallel to the recording medium's easy axis of magnetization (set field). An inventive writing process is described herein whereby a transverse magnetic field can be used exclusively to record data to a magnetic storage medium. The duration of the transverse magnetic field pulse, $\Delta t$, has a similar role in determining the final magnetization direction as that of the set field. The magnetic pulse duration is a function of the storage medium used, its physical parameters, as well as a function of the intensity of magnetic field pulse from the write head. For exemplary purposes only, it is contemplated herein that a pulse duration $\Delta t$ on the order of 1 nanosecond may be sufficient to precessionally the magnetization, however, other pulse durations are contemplated in accordance with the parameters previously set forth. Described below are several detailed realizations of the present invention that are by no means exhaustive, but are intended to convey the general idea of the present invention to one of ordinary skill in the art.

Figure 2:
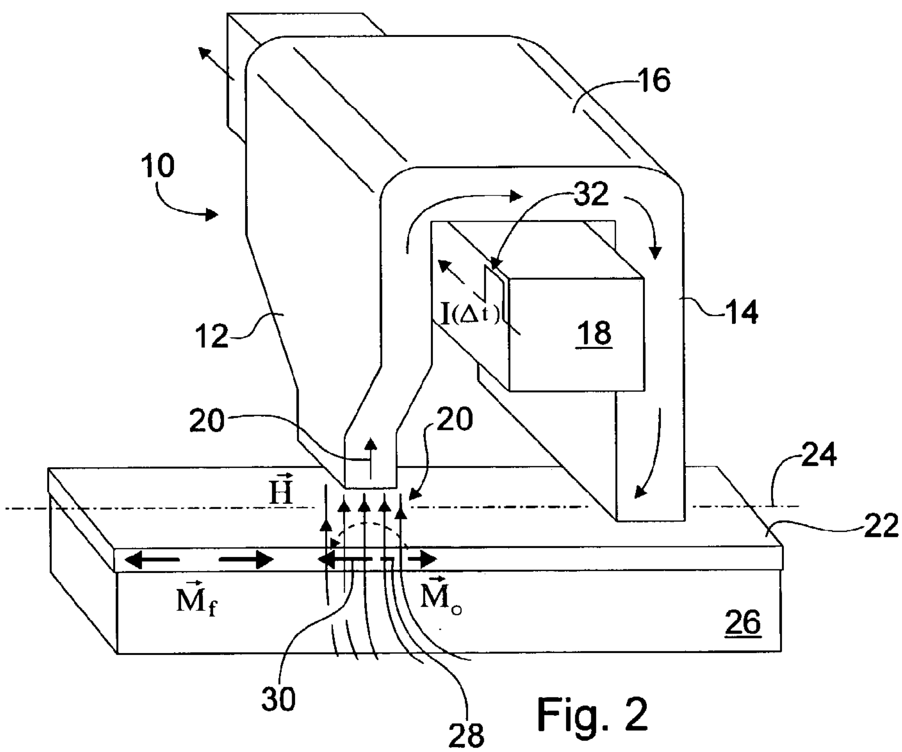
FIG. 2 is a perspective view of a magnetic recording head according to a first embodiment of the present invention.

FIG. 2 illustrates a single-pole inductive writer shown generally at 10, which incorporates the inventive precessional writing process. The writer 10 includes a main magnetic pole 12, a magnetic return pole 14, and a magnetic via 16 connecting the main 12 and return 14 magnetic poles. An electrically conductive magnetizing coil(s) 18 is provided about the magnetic via 16 and is magnetically coupled to the main pole 12 to generate a write flux 20 through the main pole 12. The write flux 20 flows into a recording medium 22 disposed adjacent the writer 10 at an air bearing surface thereof to write information onto the recording medium 22. The return pole 14 and magnetic via 16 provide a return path for the flux 20.

The writer 10 shown in FIG. 2 can deliver a largely perpendicular field to the recording medium 22, which is a longitudinal media having an easy axis of magnetization 24 parallel to a plane of the media 22. A magnetically soft underlayer (SUL) 26 is provided underneath the recording medium 22 which has the effect of "pulling" magnetic field 20 through the recording medium 22, such that the magnetic field 20 is largely perpendicular as it passes through the recording medium 22.

The dashed arrow 28 shown in FIG. 2 represents the initial magnetization direction $\vec{M}_o$ associated with a data bit previously recorded in the media 22. As shown in FIG. 2, the magnetic field 20 is applied to the medium 22 along a magnetic hard axis perpendicular to the easy axis of magnetization 24. The perpendicular field 20 is applied with a magnitude and duration appropriate to reverse the initial magnetization direction 28 of the recorded data bit to the desired final state $\vec{M}_f$ represented by the solid arrow 30. As shown in FIG. 2, the final magnetization direction 30 is substantially anti-parallel to the initial magnetization direction 28, with both magnetization directions 28, 30 lying along the medium's easy axis of magnetization 24.

Although the magnetic field 20 generated by the writer 10 can be unidirectional for magnetization reversal, since either field polarity can be generated by such a writer design it is proposed to utilize the write field orientation depicted in FIG. 2, where the small, but non-zero, longitudinal field component of the magnetic field 20 is parallel (as opposed to anti-parallel) with the final magnetization direction 30 to further minimize the energy required to write a magnetic transition (bit). For example, if the situation shown in FIG. 2 were reversed and the initial magnetization direction of the medium 22 was shown at the solid arrow 30 with the final, desired magnetization direction shown at the dotted arrow 28, the field polarity of the magnetic field 20 would be reversed from that shown in FIG. 2 (travel counter-clockwise), to ensure that the small, non-zero longitudinal field component of the field 20 is parallel with the final magnetization direction. In order for the magnetization switching to be precessional, the write field 20 is required to be applied on a short timescale, energized by a short timescale current pulse $I(\Delta t)$, shown at 32, to effectively create a magnetic footprint in the media 22. Additionally, the media 22 should be properly engineered to have a small damping constant, $\alpha$, and to rotate coherently upon application of the transverse switching field 20. In other words, the individual magnetic grains which make up a recorded bit should all rotate along basically the same path upon application of the transverse switching field 20.

Figure 3:
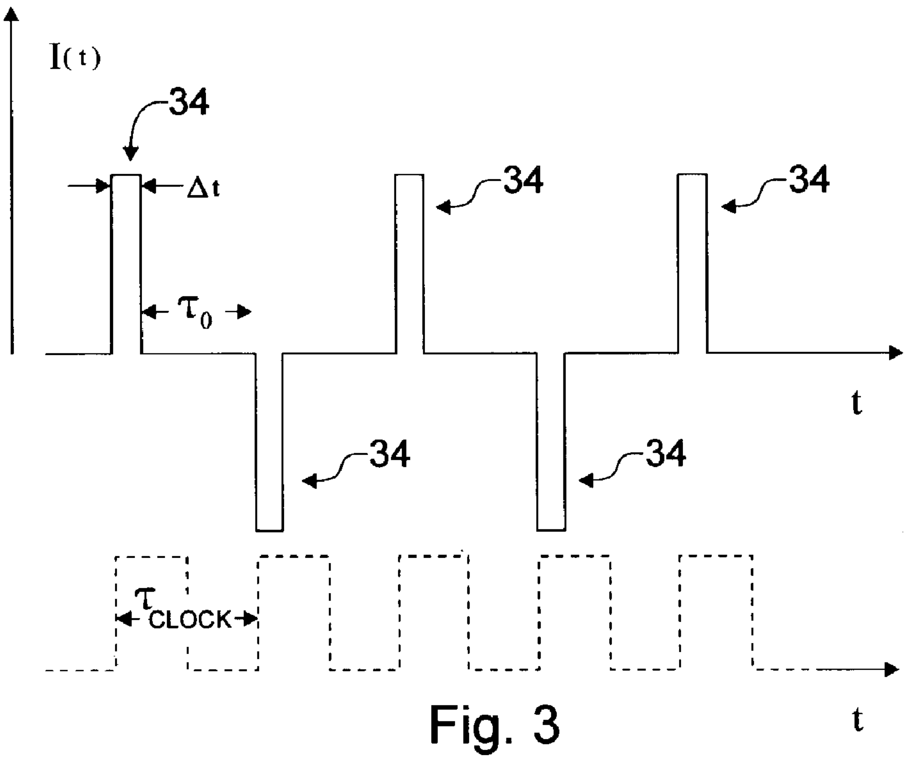
FIG. 3 is a timing diagram of current pulses in accordance with the precessional switching process of the present invention.

The time dependence of the current pulses required to generate the switching magnetic field is shown in FIG. 3. As shown in FIG. 3, the approximate time dependence of the current pulses are realizable on a sub-nanosecond timescale with the inventive technology. The current pulses, shown at 34, should not exceed the duration $\Delta t > \tau_\pi$, where $\tau_\pi$ is the maximum time to precessionally switch the magnetization of the medium to a substantially anti-parallel direction. As an example, a scenario of writing to a DC erased medium is considered. In a DC erased medium, the initial magnetization of all bits is known and is the same. The clock cycle time, $\tau_{clock}$, which is the inverse of the data rate (GHz), needs to be at least as long as the current pulse duration $\Delta t$, as two current pulses 34 of opposite current polarity will be generated every two clock cycles, and thus $\tau_{clock} \geqq \Delta t$. The zero-current time $\tau_o$ is given by the equation $\tau_0 = \tau_{clock} - \Delta t$, and the zero-current time To will be dictated by the media switching speeds and data rate of the magnetic recording. Modeling results have indicated that there is no lower bound to the magnetic field duration for precessional switching according to the present invention, only an upper bound. It can thus be assumed that the current pulse 34 duration $\Delta t$ is at least a fraction of a nanosecond and, likely, considerably less than the clock cycle ($\tau_{clock} >> \Delta t$). In this case, the magnetic write head would write by making a magnetic footprint in the recording medium, where a recorded bit in the medium would be basically a "snapshot" of the field distribution of the whole magnetic recording head where the field exceeds the coercivity of the recording medium.

The inventive writing process described herein has the potential for very high data rates, well in excess of a giga-hertz (GHz) as discussed previously. With this in mind, a writer designed in accordance with the present invention must have a high bandwidth capability. Presently, it is not known to what frequencies the inductive writers shown and described herein can be extended and, thus, it is proposed to use a writer that has the high frequency characteristics appropriate for the inventive recording process described herein. There are various writer designs for either longitudinal or perpendicular magnetic recording that have been proposed and designed to have a very high bandwidth for writing, and would be appropriate to use for the inventive precessional recording concept described herein at frequencies in excess of a giga-hertz. However, for pedagogical purposes only, the present invention described herein is illustrated as utilized in connection with inductive writers, since their operation is well recognized in the field. However, by no means is the present invention intended to be limited to only conventional writer designs, and other writer designs may be utilized without departing from the spirit and scope of the present invention.

Figure 4:
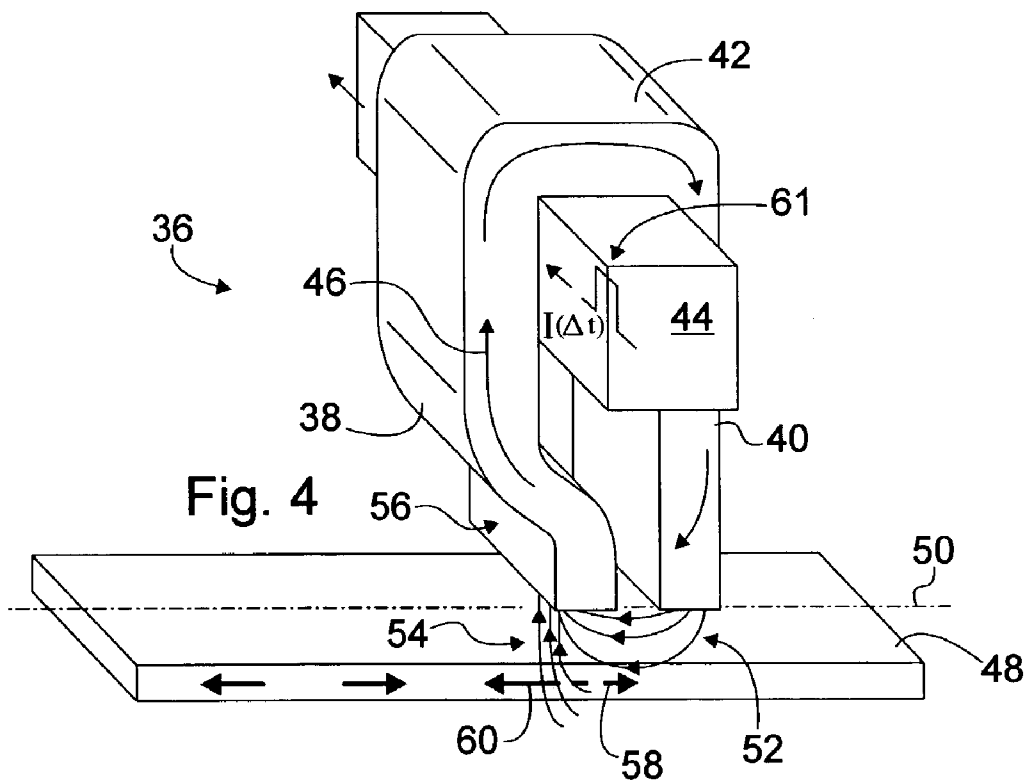
FIG. 4 is a perspective view of a magnetic recording head according to a second embodiment of the present invention.

FIG. 4 illustrates a longitudinal inductive writer, shown generally at 36, which incorporates the inventive precessional writing process. The writer 36 includes a main magnetic pole 38, a magnetic return pole 40, and a magnetic yoke, or via, 42 connecting the main 38 and return 40 magnetic poles. An electrically conductive magnetizing coil 44 is provided about the magnetic via 42 and is magnetically coupled to the main pole 38 to generate a write flux 46 through the main pole 38. The write flux 46 flows into the magnetic recording medium 48 disposed adjacent the writer 36 at an air bearing surface thereof to write information onto the recording medium 48. The return pole 40 and magnetic via 42 provide a return path for the flux 46.

The recording medium 48 is a longitudinal recording media having an easy axis of magnetization 50 which lies parallel to a plane of the recording medium 48. The soft underlayer shown in FIG. 2 is not provided, and the magnetic field 46 flowing through the recording medium 48 to write a magnetic transition (bit) includes both longitudinal

52 and perpendicular 54 field components. The peak magnitudes of the perpendicular 54 and longitudinal 52 field components are comparable, but the perpendicular field component 54 applies the largest torque to the media 48. If the magnetic field pulse duration is short enough, the longitudinal field component 52 will not effect the magnetization of the media 48 significantly, and the writing will be precessional as the perpendicular field component 54 will dominate the process. As shown in FIG. 4, the perpendicular write field is the perpendicular field component 54 at the trailing edge 56 of the main magnetic pole 38. The dashed arrow 58 represents the initial magnetization direction associated with a data bit recorded in the medium 48, and the perpendicular field component 54 is applied with a magnitude and duration appropriate to reverse its direction to the desired final magnetization state represented by the solid arrow 60. It is proposed herein to use a write field 46 orientation as depicted in FIG. 4, where the longitudinal field component 52 is parallel (as opposed to anti-parallel) with the final magnetization direction 60 to further minimize the energy required to write a magnetic transition (bit). For example, if the situation shown in FIG. 4 were reversed and the initial magnetization direction of the medium 48 was shown at the solid arrow 60 with the final, desired magnetization direction shown at the dotted arrow 58, the field polarity of the magnetic field 46 would be reversed from that shown in FIG. 4 (travel counter-clockwise), to ensure that the longitudinal field component 52 is parallel with the final magnetization direction. However, other write field orientations may be utilized without departing from the spirit and scope of the present invention. Additionally, in order for the magnetization switching to be precessional, the write field 46 is required to be applied on a short timescale, energized by a short timescale current pulse I($\Delta t$), shown at 61, to effectively create a magnetic footprint in the media 48.

Figure 5:
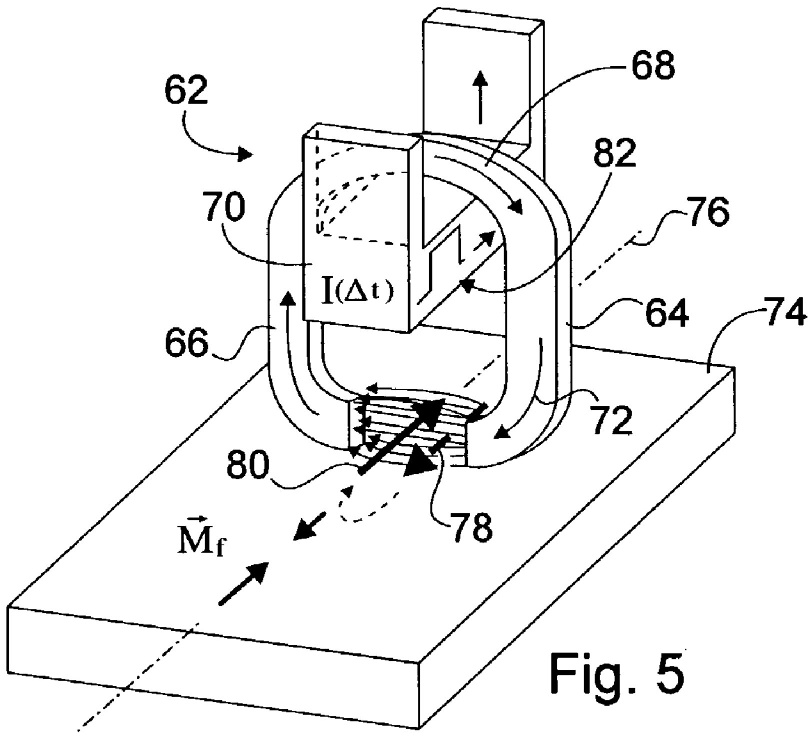
FIG. 5 is a perspective view of a magnetic recording head according to a third embodiment of the present invention.

FIG. 5 illustrates a single-plane yoke (SPY) inductive writer, shown generally at 62, for applying a transverse field to a longitudinal recording media in accordance with the precessional recording method according to the present invention. The SPY writer 62 includes a main magnetic pole 64, a magnetic return pole 66, and a magnetic via 68 connecting the main 64 and return 66 magnetic poles. An electrically conductive magnetizing coil 70 is provided about the magnetic via 68 and is magnetically coupled to the main pole 64 to generate a write flux 72 through the main pole 64. The write flux 72 flows into the recording medium 74 disposed adjacent the SPY writer 62 at an air bearing surface thereof to write information onto the recording medium 74. The return pole 66 and magnetic via 68 provide a return path for the flux 72.

The magnetic recording medium 74 is longitudinal recording media having an easy axis of magnetization 76 which is parallel with the plane of the longitudinal media 74. The SPY writer 62 has the benefit of applying a largely transverse magnetic field 72 to the magnetization of the media 74 using a low complexity writer design. The magnetic field 72 is applied perpendicular to the magnetization direction of the magnetic transitions recorded along the medium's easy axis 76, but with a magnetic field 72 that is largely in the plane of the medium 74. The dashed arrow 78 represents the initial magnetization direction associated with a data bit previously recorded in the medium 74. The magnetic field 72 is applied with a magnitude and duration appropriate to reverse the initial magnetization direction 78 to the desired final state magnetization direction represented by the solid arrow 80, which is substantially anti-parallel to the initial magnetization direction 78. In order for the media switching to be precessional, the perpendicular write field 72 is applied on a short timescale, energized by a short timescale current pulse I(Δt), shown at 82, effectively creating a magnetic footprint in the media 74.

Figure 6:
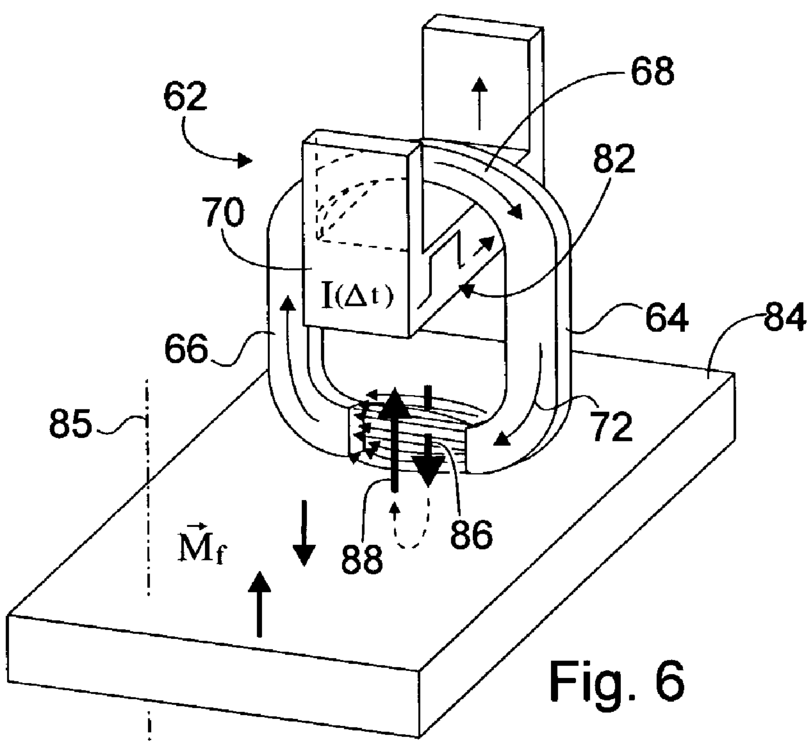
FIG. 6 is a perspective view of a magnetic recording head according to a fourth embodiment of the present invention.

FIG. 6 illustrates the SPY writer 62 shown in FIG. 5 utilized for precessional recording in accordance with the present invention to a perpendicular magnetic recording medium 84. The perpendicular medium 84 includes an easy axis of magnetization 85 which is substantially perpendicular to the plane of the medium 84. As shown in FIG. 6, the SPY writer 62 has the benefit of applying a largely transverse magnetic field 72 to the magnetization of the media 84 using a low complexity writer design. The magnetic field 72 applied by the SPY writer 62 is applied transverse to the magnetization direction of the magnetic transitions recorded in the media 84, but with a magnetic field that is largely in the plane of the media 84. The dashed arrow 86 represents the initial magnetization direction associated with a data bit previously recorded in the medium 84. The perpendicular magnetic field 72 is applied with a magnitude and duration appropriate to reverse the initial magnetization direction 86 to the desired final state magnetization direction represented by the solid arrow 88. In order for the media switching to be precessional, the write field 72 is applied on a short timescale, energized by the short timescale current pulse I(Δt), shown at 82, effectively creating a magnetic footprint in the media 84.

In using the SPY writer 62 to record magnetic transitions in a perpendicular media 84, there is a field component applied to the initial magnetization direction 86 that is parallel to the magnetization easy axis 85 of the media 84. The peak magnitudes of the transverse and parallel field components are comparable, but the transverse field component applies the largest torque to the media 84. If the field pulse duration is short enough, the parallel field component will not effect the magnetization significantly and the writing will be precessional as the transverse field component dominates the process.

Figure 7:
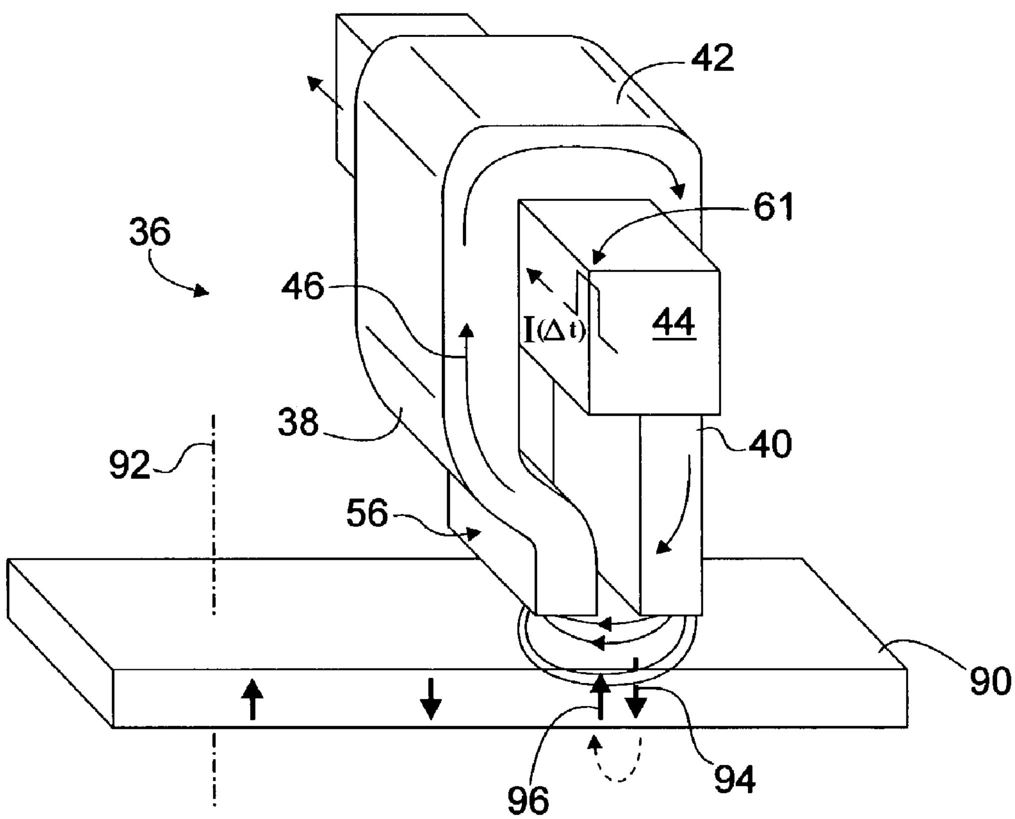
FIG. 7 is a perspective view of a magnetic recording head according to a fifth embodiment of the present invention.

FIG. 7 illustrates the longitudinal inductive writer 36 shown in FIG. 4 utilized to record magnetic transitions to a perpendicular magnetic recording medium 90 in accordance with the precessional recording method of the present invention. The perpendicular magnetic medium 90 has an easy axis of magnetization 92 which is perpendicular to the plane of the medium 90. The magnetic field 46 is applied transverse to the magnetization direction of the magnetic transitions recorded in the media 90, but with a field that is largely in the plane of the media 90. The dashed arrow 94 represents the initial magnetization direction associated with a data bit previously recorded in the medium 90. The perpendicular magnetic field 46 is applied with a magnitude and duration appropriate to reverse the initial magnetization direction 94 to the desired final state magnetization direction represented by the solid arrow 96. The magnetic field 46 is applied transverse to the magnetization direction of the recorded bits, but with a field that is largely in the plane of the media 90. In order for the media switching to be precessional, the write field 46 is applied on a short timescale, energized by the short timescale current pulse I(Δt), shown at 61, effectively creating a magnetic footprint in the media 90.

It should be noted that there is a field component applied parallel to the magnetization easy axis 92 of the media 90, as well. The peak magnitudes of the transverse and parallel field components are comparable, but the transverse field component applies the largest torque to the media 90. If the field pulse duration is short enough, the parallel field component will not effect the magnetization significantly, and the writing will be precessional as the transverse field component will dominate the process. It is proposed to use the write field orientation depicted in FIG. 7, where the parallel component of the field at the trailing edge 56 is aligned, as opposed to anti-parallel, with the final magnetization direction 96 to further minimize the energy required to write magnetic transitions (bits). For example, if the situation shown in FIG. 7 were reversed and the initial magnetization direction of the medium 90 was shown at the solid arrow 96 with the final, desired magnetization direction shown at the dotted arrow 94, the field polarity of the magnetic field 46 would be reversed from that shown in FIG. 7 (travel counter-clockwise), to ensure that the small, non-zero longitudinal field component of the field 46 is parallel with the final magnetization direction. However, any write field orientation may be utilized without departing from the spirit and scope of the present invention.

Figure 8:
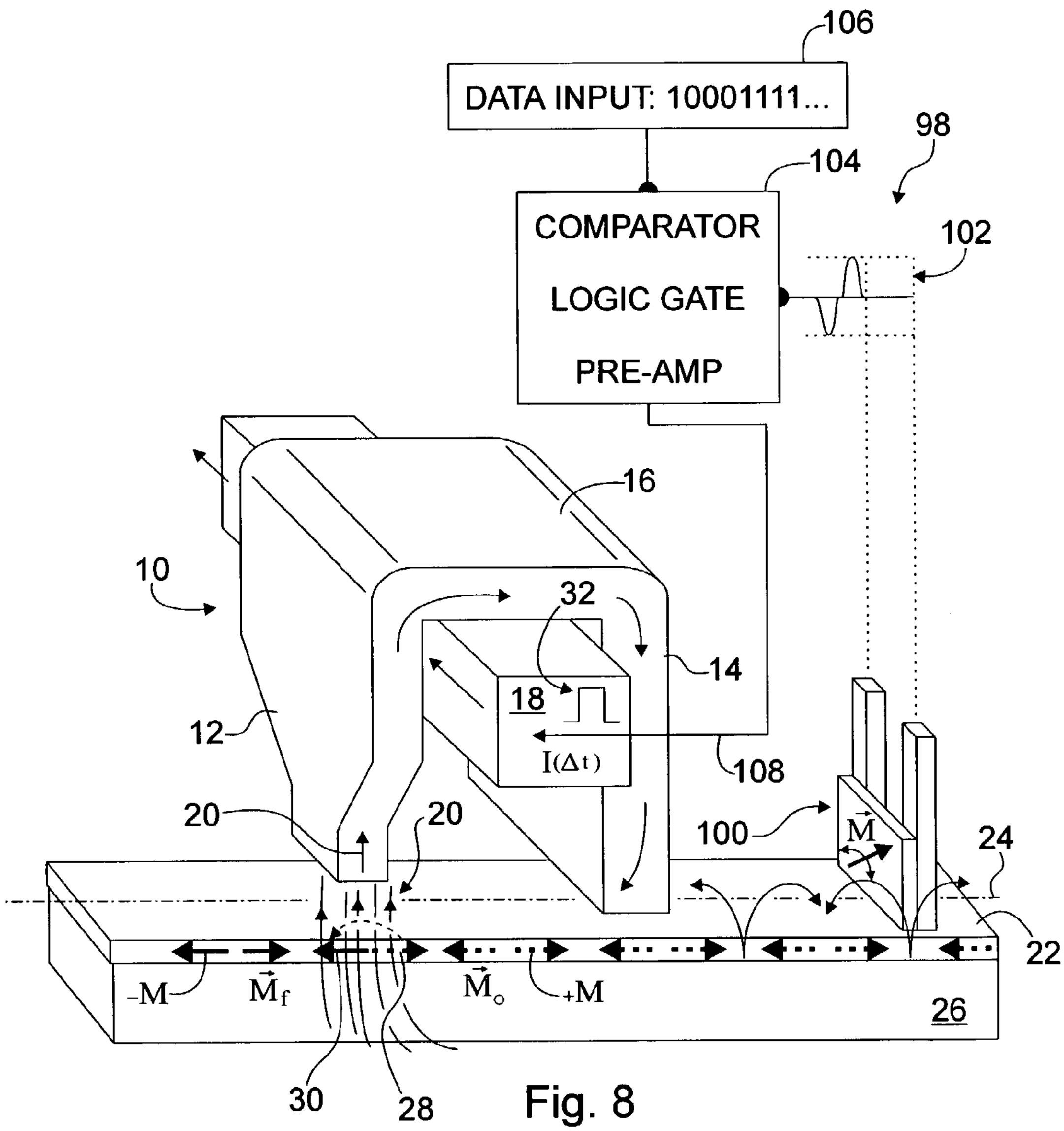
FIG. 8 is a perspective view of a magnetic recording head according to a sixth embodiment of the present invention.
Figure 9:
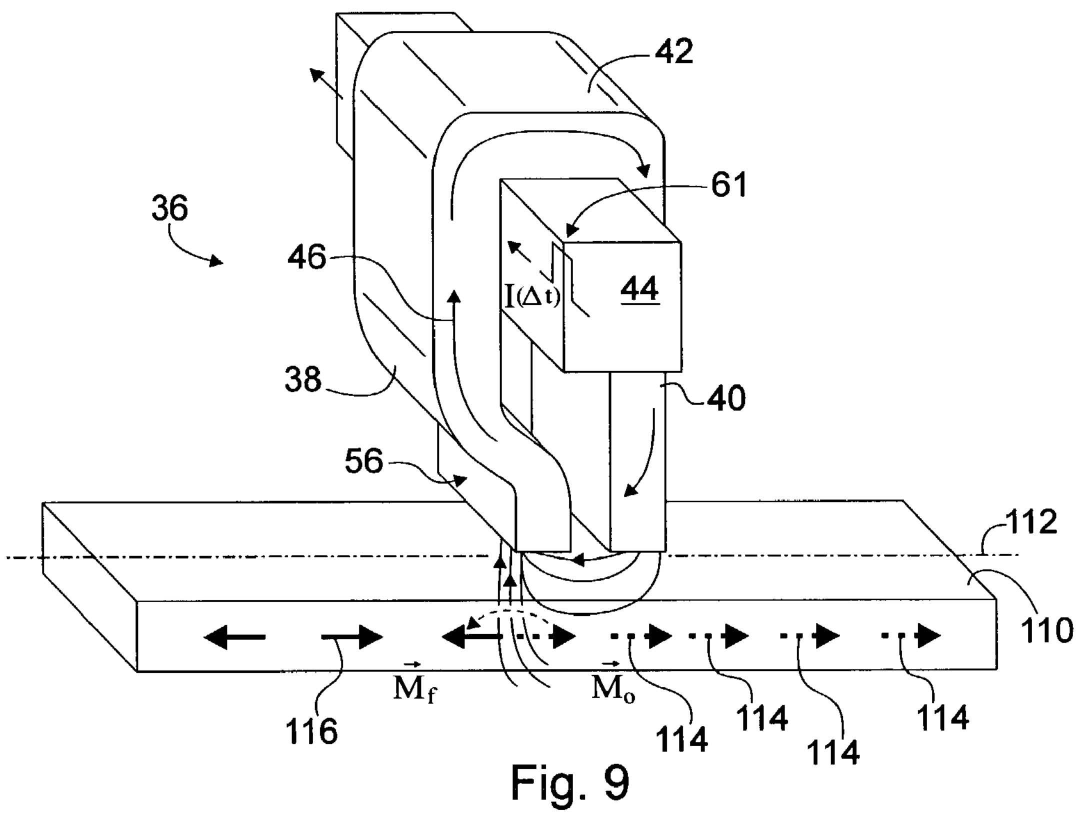
FIG. 9 is a perspective view of a magnetic recording head according to a seventh embodiment of the present invention.

As previously discussed, the present invention for precessional writing requires knowledge of the initial magnetization orientation of the recording medium to achieve the desired final magnetization direction. This is unlike traditional magnetic recording where an overwrite process is essentially independent of the initial magnetization condition. FIGS. 8 and 9 illustrate two ways to precessionally write according to the present invention when the initial magnetization conditions need to be established.

FIG. 8 illustrates the single-pole inductive writer 10 shown in FIG. 2 utilized with a controller, shown generally at 98, for determining the initial magnetization direction of the recording medium 22 and selectively energizing the coil 18 to selectively develop the magnetic field 20 in the main magnetic pole 12. While the controller 98 is depicted in FIG. 8 as utilized with the single-pole inductive writer 10, the controller 98 may be utilized with any writer design for precessionally recording magnetic transitions according to the present invention.

As shown in FIG. 8, the controller 98 includes a magnetic read head 100 for sensing the initial magnetization orientation direction of the recording medium 22 prior to writing to it. The determined magnetization direction of a previously recorded bit in the magnetic recording medium 22 is sensed by the read head 100 and fed back into the writing process. The reader 100 is positioned at the leading edge of the writer 10 to sense the magnetization orientation of the bit. The reader output, shown at 102, is fed to a comparison circuit 104 which also receives the data 106 to be recorded in the magnetic recording medium 22. The reader output data 102 and the to-be-written data 106 are compared by the comparison circuit 104, which in turn generates an output signal 108 which selectively energizes the coil 18 using current pulses 32 to selectively develop the magnetic field 20 based on the comparison of the reader output 102 and to-be-written data 106. The recording medium 22 may be magnetized in either of two bi-stable states along the easy axis of magnetization 24. The two bi-stable states of magnetization represent either logic “1” or logic “0” recorded bits.

Basically, three unique outcomes are possible based on the possible initial and final magnetization orientations of the magnetic recording media 22 (±M), where +M represents logic “1” and −M represents logic “0”. If the initial and final magnetizations are determined to be the same, no magnetic field is applied and the sensed magnetization orientation of the previously recorded bit becomes the to-be-written data (initial (+M)=final (+M) or initial (−M) =final (−M), no magnetic field applied). If the initial magnetization is determined to be positive, and the final magnetization is required to be negative, a positive magnetic field pulse is applied as shown in FIG. 8 (initial (+M)≠final (−M), positive magnetic field pulse applied). Finally, if the initial magnetization is determined to be negative and the final magnetization is required to be positive, a negative field pulse is applied which would be in the direction oppose that shown in FIG. 8 (initial (−M)≠final (+M), negative magnetic field pulse applied).

Since the reader on a conventional head is inactive during the write process, the reader is available during writing to function as the above-described read sensor 100. Thus, this embodiment of the present invention does not require an additional field sensor, and the level of complexity of the magnetic recording head for precessional recording according to the present invention is simplified. It should be noted, however, that the reader 100 should be properly shielded from the write head 10 so that it can continue to perform during the entire writing process.

A further embodiment of the present invention is to precessionally write to a DC erased media. FIG. 9 illustrates the longitudinal inductive writer 36 shown in FIGS. 4 and 7 utilized for precessionally writing to a DC erased longitudinal medium 110. The DC erased longitudinal medium 110 includes an easy axis of magnetization 112 which is parallel with the plane of the medium 110. As shown in FIG. 9, the medium 110 is initially uniformly magnetized along the data path to be written, i.e., DC erased. The initial magnetization states are shown by the dotted arrows 114. An appropriate sequence of magnetic pulses provided by the writer 36 will reverse the magnetization where appropriate, and where the DC erased orientation 114 is desired, the writer 36 will be left in its quiescent state so that no switching occurs and the initial magnetization 114 becomes the final magnetization, as shown at arrow 116. It should be noted that the embodiment shown in FIG. 9 requires a magnetic recording head which can generate a large enough field parallel to the media magnetization to DC erase it.

The present describes a method and apparatus for magnetic recording based on precessional switching of the magnetization of the media, which is in contrast to the quasi-static switching employed in conventional magnetic recording. The magnetization of the storage medium can be reserved using a transverse magnetic field applied for a duration of time that is short compared to the clock cycle. A transverse magnetic field applies the maximum torque to the medium magnetization, minimizing the energy required to write a magnetic transition (bit), while the short timescale makes it possible to extend data rates well beyond present recording technology. Additionally, the inventive precessional writing technique and apparatus described herein should make it possible to extend areal densities of hard disc drives well beyond the present state-of-the-art technology.

Both the magnitude of the applied transverse magnetic field and the pulse duration Δt can be determined, or calculated, theoretically using the equations provided herein. Alternately, they can be determined using a trial and error approach which will be readily appreciated by one of ordinary skill in the art. For example, the pulse duration Δt may be determined by bringing the write head in contact with the recording media and initially applying a magnetic field to the media for the shortest duration possible. The magnetic field should be at a fixed magnetic field strength starting with the maximum field available from the write head. The duration of the applied field is then increased until the write head writes to the recording media. The pulse duration Δt is then continually increased until the write process is no longer optimum (the write head stops writing or writes the wrong bit, or the writing process takes too long to be consistent with the desired data rate, etc.). This will give a pulse window (minimum and maximum field-pulse time duration) in which to work. The optimum pulse duration Δt should be within this pulse window.

Similarly, and for exemplary purposes only, the magnitude of the transverse magnetic field can be determined using the experimental process previously described at different magnetic field strengths (different write currents, different write head designs, different write head materials, etc.). In this manner, both the pulse duration Δt and the magnetic field strength can be optimized for a given recording system.

While the present invention has been described with particular reference to the drawings, it should be understood that various modifications can be made without departing from the spirit and scope of the present invention. For example, the current pulse duration to develop the magnetic field pulses may vary depending upon the particular physical parameters of the recording media utilized and the magnetic field intensity from the magnetic recording head. Additionally, the recording medium should be chosen to have a small damping constant, α, and rotate coherently upon application of the transverse magnetic field. However, based on the teachings herein, these particular variables and materials are readily ascertainable by those of ordinary skill in the art.

We claim:

1. A method of magnetically recording information on a magnetic recording medium having an easy axis of magnetization, the method of comprising the steps of:

providing a longitudinal magnetic recording medium having an easy axis of magnetization parallel to a plane of the magnetic recording medium;

providing a magnetically soft underlayer adjacent the magnetic recording medium; and applying a magnetic field to the magnetic recording medium substantially along an axis perpendicular to the magnetic recording medium's easy axis of magnetization, wherein the magnetic field is applied for a select period of time sufficient to switch a magnetization of the magnetic recording medium from a first magnetization direction to a second magnetization direction substantially anti-parallel to the first magnetization direction.

2. The method of claim 1, wherein the first and second magnetization directions are along the magnetic recording medium's easy axis of magnetization.

3. The method of claim 1, wherein the applying step comprises the step of applying magnetic field pulses to the magnetic recording medium substantially along the axis perpendicular to the magnetic recording medium's easy axis of magnetization, wherein each magnetic field pulse is applied for the select period of time sufficient to switch the magnetization of the magnetic recording medium from the first magnetization direction to the second magnetization direction substantially anti-parallel to the first magnetization direction.

4. A method of magnetically recording information on a magnetic recording medium having an easy axis of magnetization, the method comprising the steps of:

determining a magnetization orientation direction of a bit previously recorded in the magnetic recording medium along the easy axis of magnetization;

comparing the determined magnetization orientation direction of the previously recorded bit with a magnetization orientation direction of a bit to be recorded; and if the compared magnetization orientation directions of the previously recorded bit and the bit to be recorded are different, applying a magnetic field to the previously recorded bit in the magnetic recording medium substantially along an axis perpendicular to the determined magnetization orientation direction of the previously recorded bit, wherein the magnetic field is applied for a select period of time sufficient to switch the magnetization orientation direction of the previously recorded bit from the determined magnetization orientation direction to the magnetization orientation direction of the bit to be recorded which is substantially anti-parallel to the determined magnetization orientation direction and along the magnetic recording medium's easy axis of magnetization.

5. The method of claim 4, further comprising the step of:

if the compared magnetization orientation directions of the previously recorded bit and the bit to be recorded are the same, not applying a magnetic field to the previously recorded bit, such that the previously recorded bit becomes the bit to be recorded.

6. The method of claim 4, wherein the determining step comprises the step of DC erasing the magnetic recording medium prior to magnetically recording information thereon, such that the magnetic recording medium has a uniform magnetization orientation direction.

7. The method of claim 4, wherein the magnetic recording medium is selected from the group consisting of perpendicular and longitudinal magnetic recording mediums.

8. A magnetic recording device for magnetically recording information on a magnetic recording medium having an easy axis of magnetization, the magnetic recording device comprising:

a main magnetic pole positionable adjacent the magnetic recording medium;

a coil magnetically coupled to the main magnetic pole for developing a magnetic field in the main magnetic pole in a first magnetization direction substantially perpendicular to the magnetic recording medium's easy axis of magnetization, wherein the magnetic field developed in the main magnetic pole is selectively applied to the magnetic recording medium in the first magnetization direction for a select period of time sufficient to switch a magnetization of the magnetic recording medium from a second magnetization direction to a third magnetization direction substantially anti-parallel to the second magnetization direction; and a controller operatively connected to the coil, the controller determining an initial magnetization direction of the magnetic recording medium and selectively energizing the coil, based on said determination, to selectively develop the magnetic field in the main magnetic pole.

9. The magnetic recording device of claim 8, wherein the second and third magnetization directions are along the magnetic recording medium's easy axis of magnetization.

10. The magnetic recording device of claim 8, wherein the applied magnetic field includes a magnetic field component along an axis parallel to the magnetic recording medium's easy axis of magnetization, wherein the magnetic field component is applied in a fourth magnetization direction substantially parallel to the third magnetization direction.

11. The magnetic recording device of claim 8, wherein the magnetic recording medium is selected from the group consisting of perpendicular and longitudinal magnetic recording mediums.

12. The magnetic recording device of claim 8, wherein the magnetic field in the main magnetic pole comprises magnetic field pulses applied to the magnetic recording medium in the first magnetization direction, wherein each of the magnetic field pulses is applied for the select period of time sufficient to switch the magnetization of the magnetic recording medium from the second magnetization direction to the third magnetization direction substantially anti-parallel to the second magnetization direction.

13. The magnetic recording device of claim 8, wherein the magnetic recording medium comprises a DC erased magnetic recording medium having a uniform magnetization direction.

14. The magnetic recording device of claim 8, wherein the controller comprises:

a magnetic read head for determining the initial magnetization direction of the magnetic recording medium; and a comparison circuit receiving the determined magnetization direction of the magnetic recording medium as a first input and a magnetization direction of information to be recorded as a second input and generating an output signal based on a comparison of the first and second inputs, the output signal selectively energizing the coil to selectively develop the magnetic field in the main magnetic pole based on the comparison of the first and second inputs.

15. A magnetic recording device for magnetically recording information on a magnetic recording medium having an easy axis of magnetization, the magnetic recording device comprising:

a main magnetic pole positionable adjacent the magnetic recording medium;

a coil magnetically coupled to the main magnetic pole for developing a magnetic field in the main magnetic pole in a first magnetization direction substantially perpendicular to the magnetic recording medium's easy axis of magnetization; and a controller operatively connected to the coil for selectively energizing the coil to selectively develop the magnetic field in the main magnetic pole, wherein the controller comprises:

a magnetic read head for determining a magnetization direction of a previously recorded bit in the magnetic recording medium; and a comparison circuit receiving the determined magnetization direction of the previously recorded bit as a first input and a magnetization direction of a bit to be recorded as a second input and generating an output signal based on a comparison of the first and second inputs, the output signal selectively energizing the coil to selectively develop the magnetic field in the main magnetic pole based on the comparison of the first and second inputs.

16. The magnetic recording device of claim 15, wherein if the compared magnetization directions of the previously recorded bit and the bit to be recorded are different, the output signal energizes the coil to apply the magnetic field developed in the main magnetic pole to the previously recorded bit for a select period of time sufficient to switch the magnetization direction of the previously recorded bit from the determined magnetization direction to the magnetization direction of the bit to be recorded which is substantially anti-parallel to the determined magnetization direction and along the magnetic recording medium's easy axis of magnetization, and wherein if the compared magnetization directions of the previously recorded bit and the bit to be recorded are the same, the output signal de-energizes the coil to not apply the magnetic field to the previously recorded bit, such that the previously recorded bit becomes the bit to be recorded.

17. The method of claim 15, wherein the magnetic recording medium is selected from the group consisting of perpendicular and longitudinal magnetic recording mediums.

18. A method of magnetically recording information on a magnetic recording medium, the method comprising the steps of:

determining an initial magnetization direction of the magnetic recording medium; and selectively applying, based on said determination, a magnetic field to the magnetic recording medium along an axis substantially perpendicular to an axis of the initial magnetization direction, wherein the magnetic field is selectively applied for a period of time sufficient to switch a magnetization of the magnetic recording medium from the initial magnetization direction to a final magnetization direction substantially anti-parallel to the initial magnetization direction.

19. The method of claim 18, wherein the initial and final magnetization directions are along an easy axis of magnetization of the magnetic recording medium.

20. The method of claim 18, wherein the magnetic recording medium is selected from the group consisting of perpendicular and longitudinal magnetic recording mediums.

21. The method of claim 18, wherein the determining step comprises the step of DC erasing the magnetic recording medium prior to magnetically recording information thereon, such that the magnetic recording medium has a uniform initial magnetization direction throughout.

22. The method of claim 18, wherein the determining step comprises the step of reading the initial magnetization direction of the magnetic recording medium prior to magnetically recording information thereon.

23. The method of claim 18, wherein the step of selectively applying, based on said determination, comprises the steps of:

if the determined initial magnetization direction of the magnetic recording medium and a magnetization direction of information to be recorded are different, applying the magnetic field to the magnetic recording medium along an axis substantially perpendicular to an axis of the initial magnetization direction, wherein the magnetic field is selectively applied for a period of time sufficient to switch a magnetization of the magnetic recording medium from the initial magnetization direction to a final magnetization direction substantially anti-parallel to the initial magnetization direction; and if the determined initial magnetization direction of the magnetic recording medium and the magnetization direction of information to be recorded are the same, not applying the magnetic field to the magnetic recording medium, such that the initial magnetization direction of the magnetic recording medium becomes the information to be recorded.

* * * * *